United States Patent [19]
McIntosh et al.

[11] 3,912,906
[45] Oct. 14, 1975

[54] CIRCUIT FOR ELECTRIC HEATING SYSTEM

[75] Inventors: Harold A. McIntosh; Bradford N. Hull, both of Los Angeles, Calif.

[73] Assignee: Robertshaw Controls Company, Richmond, Va.

[22] Filed: Apr. 24, 1974

[21] Appl. No.: 463,484

[52] U.S. Cl............ 219/486; 219/296; 219/295; 219/483
[51] Int. Cl.² .......................................... H05B 1/02
[58] Field of Search .......... 219/296, 298, 306, 329, 219/337, 483, 484, 485, 486, 501; 317/16, 18; 337/340

[56] References Cited
UNITED STATES PATENTS

| | | | |
|---|---|---|---|
| 3,046,380 | 7/1962 | Carlson | 219/376 X |
| 3,242,978 | 3/1966 | McGann | 219/486 X |
| 3,351,739 | 11/1967 | Eckman | 219/486 X |
| 3,588,471 | 6/1971 | Chambers | 219/486 |

Primary Examiner—L. T. Hix
Assistant Examiner—Fred E. Bell
Attorney, Agent, or Firm—Anthony A. O'Brien

[57] ABSTRACT

An electrical circuit for a heating system has a plurality of electrical resistance heating elements which are sequentially operated while a blower is maintained in operation when any of the heating elements are energized. The blower motor is operated by a controlled switch which has a control electrode connected to both a thermostat switch and to a device, such as a magnetic current sensing transformer, sensing energization of any of the electrical resistance heating elements.

8 Claims, 12 Drawing Figures

*FIG. 12*

CIRCUIT FOR ELECTRIC HEATING SYSTEM

BACKGROUND OF THE INVENTION

1. Field of the Invention

The invention relates to electrical circuits for electric heating systems, and in particular, to heating system circuits wherein electrical heating elements are sequentially energized to avoid power line surges and a blower motor is maintained in operation by sensing energization of any of the electrical heating elements.

Description of the Prior Art

The prior art, as exemplified by U.S. Pat. Nos. 3,046,380, 3,242,978, 3,329,869, 3,351,739, 3,419,756, 3,588,471, 3,659,155 and 3,770,977 contains a number of circuits for heating systems employing plural resistance heating elements which are sequentially energized. In the U.S. Pat. Nos. 3,588,471 and 3,659,155, there are disclosed circuits including a ferromagnetic-core encircling leads to the resistance heating elements with a pickup coil on the core for sensing current through any of the plurality of resistance heating elements to energize a control electrode of a silicon controlled rectifier which operates a relay energizing a fan; a thermostat switch energizes a first of a plurality of heat motor operated switches which are sequentially operated to sequentially apply electrical power to the leads and resistance heating elements.

SUMMARY OF THE INVENTION

The invention is summarized in that a circuit for an electrical heating system includes first, second and third switches, control switch means for operating the first switch, said control switch means having a control electrode which when energized operates the control switch means, means for operating the second switch a predetermined duration after the operation of the first switch, means for operating the third switch a predetermined duration after the operation of the second switch, first and second heating elements connected to the respective second and third switches to be energized when the respective second and third switches are operated, fluid moving motor means operated by operation of the first switch for moving a fluid medium over the first and second heating elements, a thermostat having contacts which are closed at temperatures below a selected temperature and open at temperatures above the selected temperature, said contacts connected to the control electrode for energizing the control electrode when closed, and connected in series with the second switch operating means for sequentially terminating operation of the second switch operating means and the third switch operating means when open, and means sensing energization of any of the first and second heating elements and connected to the control electrode for energizing the control electrode.

An object of the invention is to construct a circuit for a heating system employing significantly less elements and a new arrangement of parts resulting in a lower cost and more efficient operation.

A further object of the invention is to construct a circuit for a heating system eliminating a separate motor operating relay apart from a first switch of a plurality of sequentially operated switches which sequentially energize a plurality of electrical resistance elements.

It is a feature of the invention to utilize a thermostat to energize a semiconductive element operating a first of a plurality of sequentially operated switches, and to sequentially deenergize a second and subsequent switches while the semiconductive element is maintained energized by current through resistance elements controlled by the second and subsequent switches.

Other objects, advantages and features of the invention will become apparent from the following description taken in conjunction with the accompanying drawings.

DESCRIPTION OF THE PREFERRED EMBODIMENTS

Figure 1:
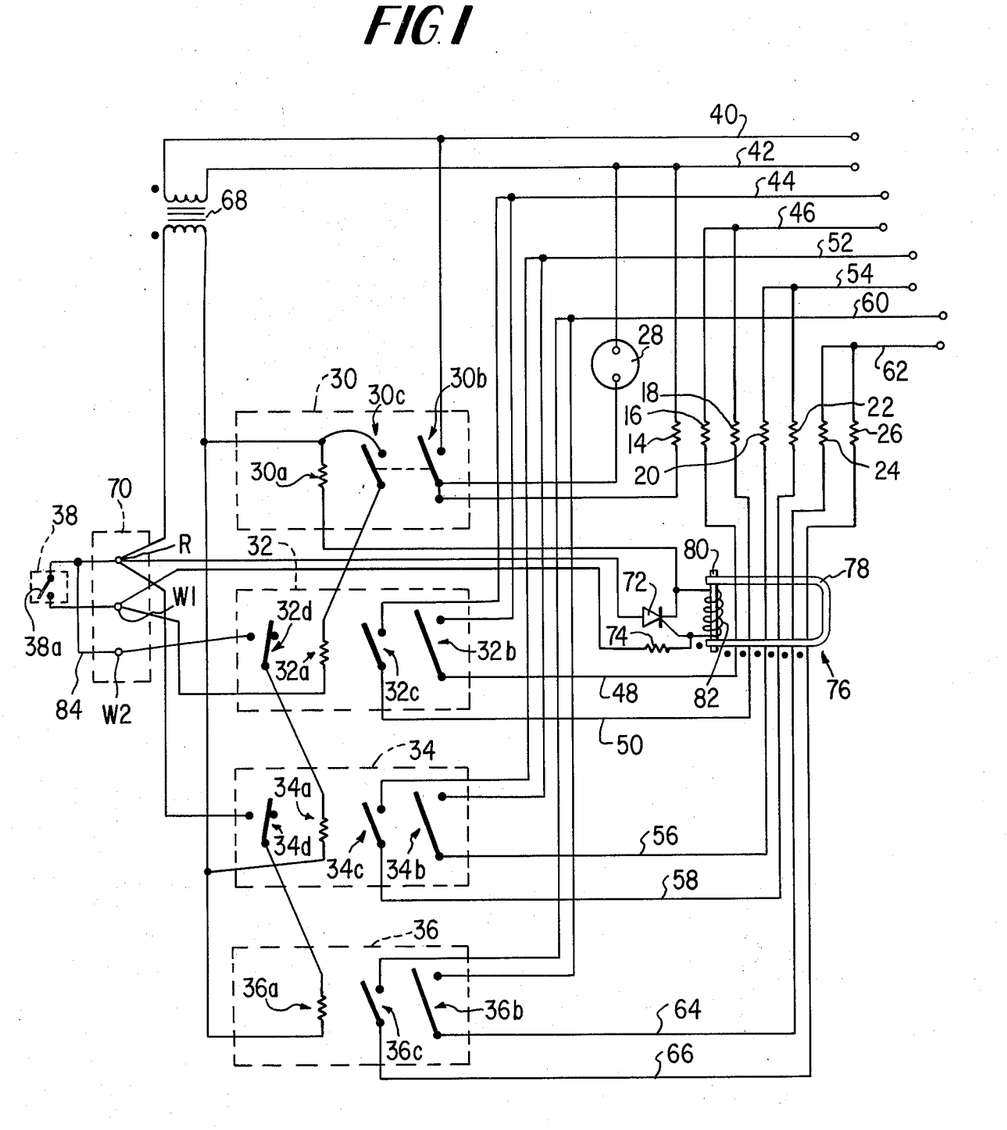
FIG. 1 is a diagram of an electrical circuit for a heating system in accordance with the invention.

As is illustrated in FIG. 1, the invention is embodied in an electrical circuit for a heating system including electrical resistance heating elements 14, 16, 18 20, 22, 24 and 26, an electrical motor 28, sequencers or heat motor operated relays 30, 32, 34 and 36, and a thermostatic switch device 38. The thermostatic switch device 38 is a conventional thermostat which has contacts 38a which close at temperatures below a selected temperature and open at temperatures above the selected temperature. The resistance elements 14, 16, 18, 20, 22, 24 and 26 are conventional heating elements mounted in a heat chamber (not shown) through which a fluid, such as air, is moved by a fluid flow device, such as a blower driven by the motor 28, through a duct (not shown) to a room where the thermostat 38 is positioned; suitable constructions of heat chambers, air blowers, and ducts being well known and described in the prior art. t The sequencer 30 includes a heat motor indicated generally at 30a, and normally open switches indicated generally at 30b and 30c. The sequencer 32 includes a heat motor indicated generally at 32a, normally open switches indicated generally at 32b and 32c and a single-pole double-throw switch indicated generally at 32d. The sequencer 34 is substantially similar to sequencer 32, and has a heat motor indicated generally at 34a for operating switches indicated generally at 34b, 34c and 34d corresponding to the respective switches 32*b*, 32*c* and 32*d*. Switches indicated generally at 36*b* and 36*c* in the sequencer 36 are controlled by a heat motor indicated generally at 36*a*.

In the power circuit for energizing the heating elements 14, 16, 18, 20, 22, 24 and 26, one side of the switch 30*b* is connected to a power line 40 while the resistance element 14 and the motor 28 are connected in parallel between the other side of the switch 30*b* and a power line 42. One side of the switch 32*b* is connected to a power line 44 while the resistance element 16 is connected between a power line 46 and a line 48 to the other side of the switch 32*b*. Similarly, one side of the switch 32*c* is connected to the power line 44 while the resistance element 18 is connected between the power line 46 and a line 50 to the other side of the switch 32*c*. Also in a similar manner, one side of the switch 34*b* is connected to a power line 52 while the resistance element 20 is connected between a power line 54 and line 56 to the other side of the switch 34*b*; one side of the switch 34*c* is connected to the power line 52 while a resistance element 22 is connected between the power line 54 and a line 58 to the other side of the switch 34*c*; one side of the switch 36*b* is connected to a power line 60 while a resistance element 24 is connected between a power line 62 and a line 64 to the other side of the switch 36*b*; and, one side of the switch 36*c* is connected to the power line 60 while the resistance element 26 is connected between the power line 62 and a line 66 to the other side of the switch 36*c*. The power lines 40, 44, 52 and 60 are connected to one side or the same phase of a suitable AC source, such as a 120 or 240 volt 60 hertz power source, while the lines 42, 46, 54, and 62 are connected to the other side or opposite phase of the AC power source.

A low voltage control circuit for the sequencers 30, 32, 34 and 36, includes a step-down voltage transformer 68, such as a 240 volt to 24 volt transformer, having its primary connected across the power lines 40 and 42 with its secondary connected on one side to the terminal R of a low voltage terminal block 70. One circuit through the secondary of the transformer 68 is completed through the heat motor 30*a*, and control switch device, such as a silicon controlled rectifier 72, to the terminal R. A control electrode of the silicon controlled rectifier 72 is connected by a resistance 74 to a terminal W1 of the terminal block 70 which is connected by the thermostat contacts 38*a* to the terminal R. Another circuit across the secondary of the low voltage transformer 68 includes the switch 30*c* in series with the heat motor 32*a* to the terminal W1. The lines 48, 50, 56, 58, 64 and 66 extend through a magnetic current sensing transformer indicated generally at 76, which includes a U-shaped member 78 with its open end enclosed by a bar 80 to form an enclosed loop surrounding the lines 48, 50, 56, 58, 64 and 66. The U-shaped member 78 and the bar 80 are made of a suitable ferro-magnetic transformer core material having a low retentivity. A pickup coil 82 is wound on the bar 80 and has its ends connected from the cathode to the control electrode of the silicon controlled rectifier 72. The phase of the current applied to the lines 40 and 42, 44 and 46, 52 and 54, and 60 and 62 as well as the direction of the winding 82 with respect to the direction of the lines 48, 50, 56, 58, 64 and 66 together with the polarity of the transformer 68 is selected to produce suitable induced signals in the coil 82 rendering the silicon controlled rectifier 72 conductive during positive half cycles of the voltage applied across the anode and cathode of the silicon controlled rectifier 72. The cross sectional dimensions of the magnetic member 78 and bar 80 as well as the number of windings of the pickup coil 82 is selected to limit the induced voltage across the control and cathode electrodes of the silicon controlled rectifier 72 to less than a voltage at which the silicon controlled rectifier 72 can be damaged.

One side of the heat motor 34*a* is connected to one side of the secondary of the transformer 68 while the other side of the heat motor 34*a* is connected to the contact arm of the double-throw switch 32*d* which has its normally open contact connected to a terminal W2 in the terminal block 70. A jumper wire 84 is connected across the terminals R and W2 of the terminal block. Similarly, one side of the heat motor 36*a* is connected to one side of the secondary of the transformer 68 while the other side of the heat motor 36*a* is connected to the contact arm of the switch 34*d* which has its normally open contact connected to the terminal R.

Figure 2:
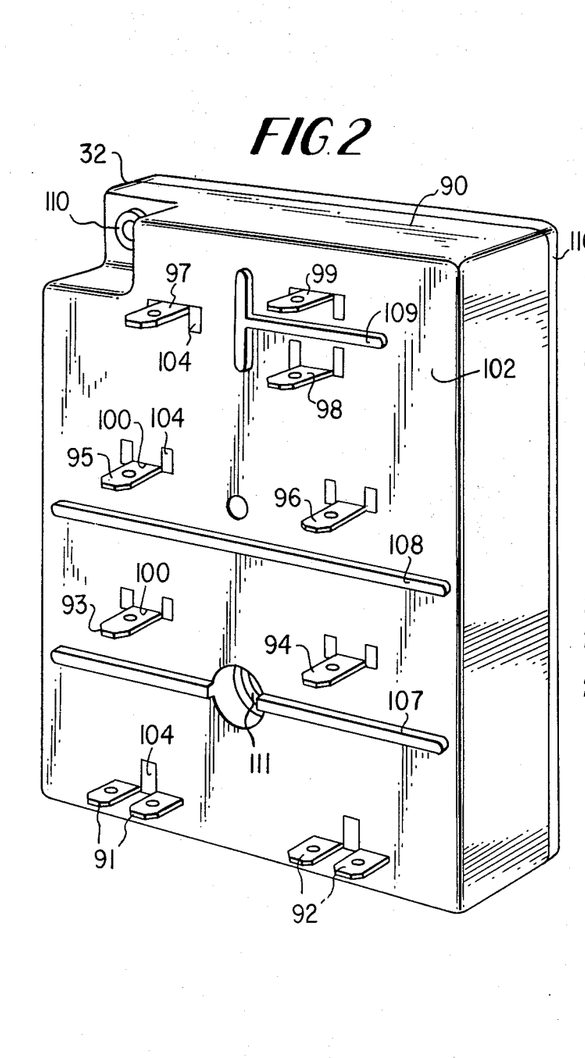
FIG. 2 is a perspective view of an electrical sequencer or relay in the circuit shown in FIG. 1.
Figure 3:
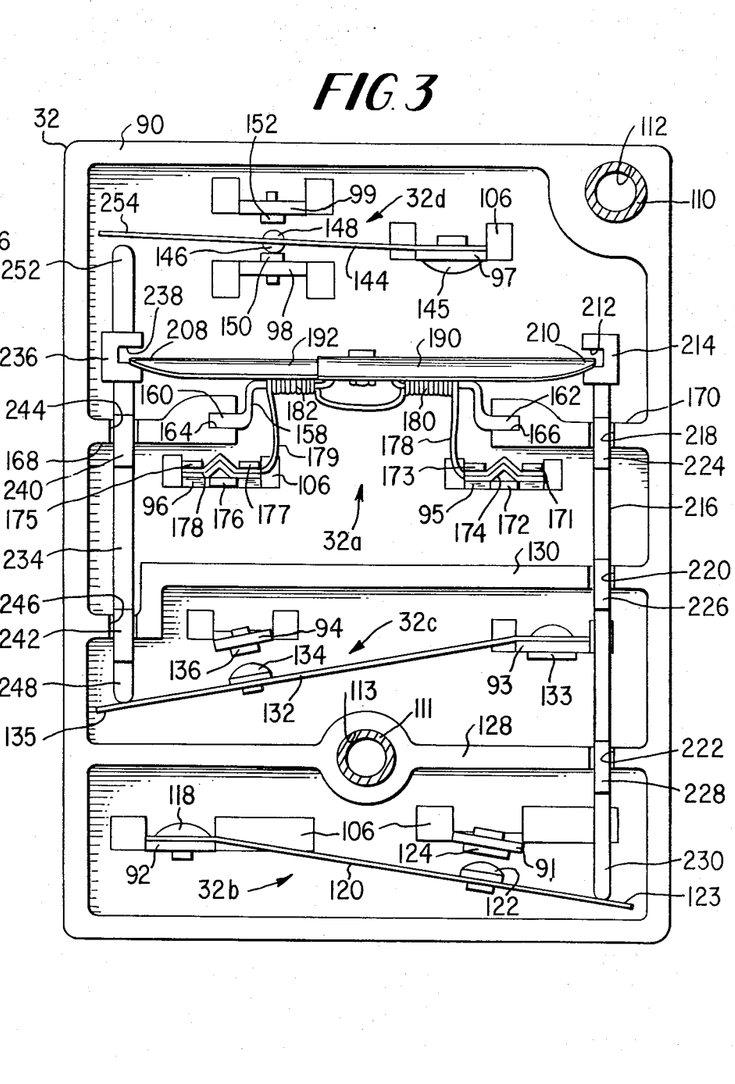
FIG. 3 is a back elevation view of the sequencer of FIG. 2 with a back cover removed.

The sequencer 32, as shown in FIGS. 2 and 3, includes a housing 90 made of a suitable insulative material, such as a phenolic resin, and having electrically conductive terminals 91, 92, 93, 94, 95, 96, 97, 98 and 99 extending through slots 100 in a front wall 102 of the housing 90. The terminals 91 through 99 are formed from metal strips and have portions projecting outward from the housing 90 forming quick connect and disconnect terminals for securing suitable connectors and leads thereto for making the electrical circuit connections shown in FIG. 1 to the sequencer 32; the terminals 91 and 92 each having a pair of outward projecting portions for securing a pair of connectors thereto. Tab portions 104 of the terminals 90 through 99 are bent into engagement and recessed in the outside surface of the front wall 102 while tab portions 106 of the terminals 91 through 99 are bent into engagement with the inside or interior surface of the wall 102 for firmly securing the terminals 91 through 99 in the slots 100 of the housing 90. Ribs 107, 108 and 109 are provided on the exterior surface of the wall 102 to increase electrical isolation of the terminals 91 through 99. Tubular rivets or eyelets 110 and 111 extend through holes 112 and 113 in recessed portions of the front wall 102 and through holes (not shown) in a back cover 116 for securing the back cover 116 to the housing 90. The eyelets 110 and 111 have a suitable size for receiving screws or bolts (not shown) to mount the housing 90 on a suitable support (not shown).

Inside of the housing 90, as shown in FIG. 3, a rivet 118 secures one end of a resilient flexible contact arm 120 on the terminal 92. A movable contact 122 is mounted on the arm 120 intermediate the secured end and a free end 123 of the arm 120. The movable contact 122 is aligned for engaging a stationary contact 124 which is mounted on the terminal 91. The switch 32*b*, which includes the contact arm 120 and contacts 122 and 124, is isolated within a chamber formed by a partition or wall 128 within the housing 90. Similarly, the switch 32*c*, isolated in a chamber formed by a wall or partition 130, includes a resilient contact arm 132 mounted by a rivet 133 on the terminal 93, a movable contact 134 attached to the arm 132 intermediate its secured end and a free end 135, and a stationary contact 136 mounted on the terminal 94 in alignment to be engaged by the movable contact 134. The switch 32*d* includes a resilient contact arm 144 mounted by a rivet 145 on the terminal 97, movable contacts 146 and 148 mounted on opposite sides of the contact arm 144, and stationary contacts 150 and 152 mounted on the respective terminals 98 and 99 in alignment with the respective movable contacts 146 and 148. The arms 120, 132 and 144 are formed of suitable relatively conductive and resilient metals, such as beryllium copper, and are mounted on the terminals 92, 93, and 97 such as to urge the movable contacts 122, 134 and 146 into engagement with the respective stationary contacts 124, 136 and 150; the arm 144 urging the movable contact 148 away from the stationary contact 152.

The heat motor 32a includes an inverted U-shaped member 158 having outwardly flared ends 160 and 162 supportingly engaged within slots 164 and 166 formed in respective projecting portions 168 and 170 of the housing 90. The inside end of the terminal 95 is split into three projecting prongs 171, 172 and 173 between which are wedged a connector 174. Similarly, the inside end of the terminal 96 is split into three projecting prongs 175, 176 and 177 between which are wedged a connector 178. The connectors 174 and 178 are conductive metal strips which are folded over insulation-stripped portions of ends 178 and 179 of a resistance wire wound into equal divided coil portions 180 and 182 on opposite sections of the member 158. The folded connectors 174 and 178 are clinched into a W-configuration prior to being forced between the prongs to insure a good electrical connection to the heater wire ends 178 and 179.

Figure 4:
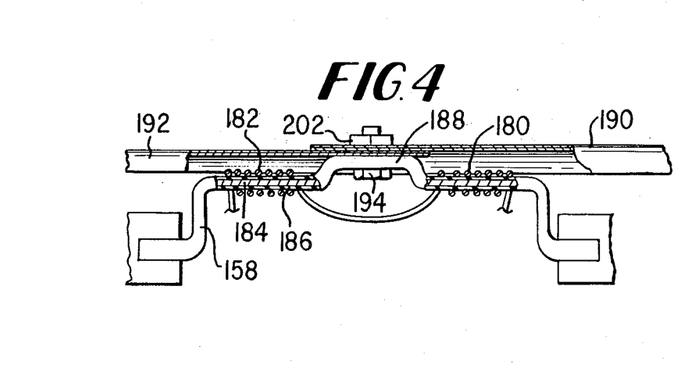
FIG. 4 is a detailed view of a broken away portion of the sequencer as shown in FIG. 3.

As shown in FIG. 4, the member 158 is formed from a thermally conductive strip 184 which is covered, at least on the surfaces where the coil portions 180 and 182 are mounted, with a thin electrically insulative film 186. A suitable material for the metal strip 184 can be selected from heat resistant metals such as the stainless steels, while the film 186 can be formed by dipping or wrapping a film of insulative material, such as polyimide plastic sold under the trademark KAPTON by DuPont, E. I., de Nemours & Co., Inc., on the strip 184. A film 186 having a thickness in the range from 0.0254 to 0.0508 millimeters (1 to 2 mils) provides suitable electrical insulation while permitting thermal conductivity through the film 186. The resistance wire forming coil portions 180 and 182 is a suitable insulated resistance wire, such as a glass fiber covered wire, which has a suitable resistance to form an electrical heater with a positive temperature coefficient of resistance. One suitable insulated resistance wire is a nickel alloy BALCO sold by Wilbur B. Driver Co., of Newark, New Jersey. An upward extending boss 188 is formed in the member 158 and has one ends of elongated and strip-like bimetal members or elements 190 and 192 secured thereto, such as by a rivet, or a bolt 194 extending through aligned openings in the boss 188 and the bimetal elements 190 and 192 and secured by a nut 202. The boss 188 is suitably formed to support the bimetal elements 190 and 192 in a spaced relationship above the portions 180 and 182 of the heater coil.

Figure 5:
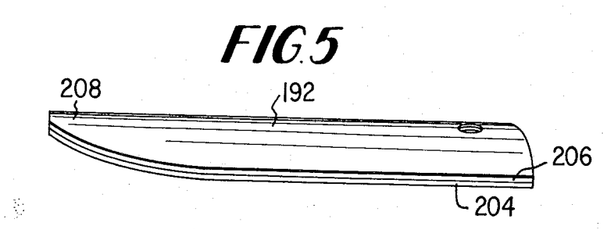
FIG. 5 is a detailed view of a bimetal element in a low temperature state of the sequencer of FIGS. 2 and 3.
Figure 6:
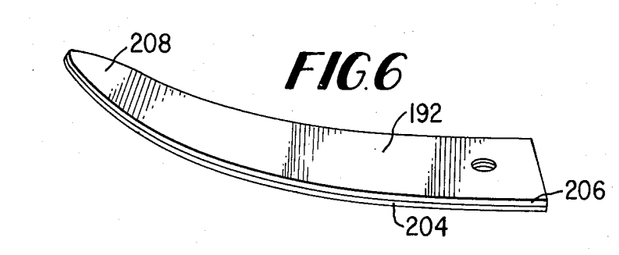
FIG. 6 is a view similar to FIG. 5 but illustrating a high temperature state of the bimetal element.

Referring to FIGS. 5 and 6, the bimetal element 192 includes a layer 204 of a metal with a relatively large positive coefficient of thermal expansion bonded to a layer 206 of a metal with a substantially lesser coefficient of the thermal expansion. The grain directions of the bimetal element 192 generally run along the longitudinal direction of the element 192. The bimetal element 192 is formed or bent, at abouot room temperature, into a longitudinal radius of curvature, as shown in FIG. 6. Then the bimetal element 192 is formed or bent into a transverse radius of curvature as shown in FIG. 5 to normally hold the bimetal element 192 longitudinally straight at temperatures less than a predetermined temperature which is substantially above the normal room temperature of formation. The transverse curvature of the bimetal element 192 is selected in consideration with the relative coefficients of thermo expansion of the layers 204 and 206 to resist longitudinal curvature or temperature warp until the predetermined temperature is reached where the transverse warp reduces the degree of transverse curvature or flattens the bimetal element 192 until the sum of the forces generated by the longitudinal temperature warp and the stress resulting from the longitudinal curvature in formation of the element 192 exceed the retaining forces of the transverse curvature for producing an upward snap action movement of a free end 208 of the bimetal element 192. The metals of the layers 204 and 206 are further selected to be essentially resilient throughout their ranges of curvature produced by temperature changes to allow the element 192 to snap back to its position in FIG. 5 when the temperature is reduced to a temperature which is slightly less than the predetermined temperature and when the stress from the formed transverse curvature exceeds the sum of the temperature warp forces and the stress of the formed longitudinal curvature. The corners of the free end 208 of the bimetal element 192 are removed to form a tapered end.

The bimetal element 190 is similar to the bimetal element 192 except that the bimetal element 190 is selected to operate at a lower temperature than the bimetal element 192. Since temperature of operation is determined by the degree of transverse curvature when the other relative parameters are about equal in the elements 190 and 192, making the bimetal element 190 with a larger transverse radius of curvature, i.e., more flat, than the element 192 results in the element 190 snapping to its raised or longitudinally curved position and returning to its longitudinally straight position at significantly lower operating temperatures than the respective operating temperatures of the element 192. The bimetal element 190 is mounted on top so that its interior transverse curved surface is next to the outside transverse curved surface of the bimetal element 192.

A tip or free end 210 of the bimetal element 190 extends into a transverse slot 212, FIG. 3, formed within an enlarged portion 214 of an elongated switch operator 216 which slidably extends through slots 218, 220 and 222 formed within the respective portion 170, partition 130 and paratition 128 to be moved therein by the movement of the end 210. The operator 216 is formed of a rigid insulative material, such as a phenolic resin, and has portions 224, 226 and 228 which have rectangular transverse cross sections mating with the slots 218, 220 and 222 such as to prevent rotation of the operator 216 about a longitudinal axis. The operator 216 has a length designed to engage an end 230 of the operator against the free or unsecured end 123 of the switch arm to normally force the switch arm 120 to a position disengaging the movable contact 122 from the stationary contact 124 when the bimetal element 190 is in its low temperature state or is longitudinally straight, and to disengage the end 230 from the end 123, FIG. 7, when the bimetal element 190 is in its high temperature or longitudinally curved state.

An elongated switch operator 234 has an enlarged portion 236 with a slot 238 for receiving the tip or free end 208 of the bimetal element 192. The operator 234, formed of a material similar to the operator 216, has portions 240 and 242 with rectangular transverse cross sections slidably extending within slots 244 and 246 formed in the respective portion 168 and the partition 130 for slidably supporting the operator 234 while preventing rotation of the operator 234. The lower end 248 of the operator 234 extends such as to engage the free end 135 of the switch arm 132 to normally disengage the movable contact 134 from the stationary contact 136 when the bimetal element 192 is longitudinally straight or in its low temperature state, and to disengage the end 248 from the end 135, FIG. 8, when the bimetal element 192 is in its high temperature state. The upper end 252 of the operator 234 is disposed beneath a free end 254 of the switch arm 144 to allow the resilient arm 144 to normally bias the movable contact 146 into engagement with the normally closed contact 150 when the bimetal element is in its low temperature state. The operator 234 has a length extending to its end 252 designed to engage the end 254 of the contact arm 144 and move the contact 146 from engagement with the contact 150 and to move the movable contact 148 into engagement with the stationary contact 152 when the bimetal element 192 changes to its high temperature state where it is longitudinally curved.

The various parameters of the heating coil portions 180 and 182 and the bimetal elements 190 and 192 are selected to produce suitably delayed operating and return times for the bimetal elements 190 and 192 when the heating coil is energized and deenergized. For example, such parameters can be selected to change the bimetal element 190 to its high temperature state about 25 seconds after energization of the heating coil portions 180 and 182, and to return the bimetal element 190 to its low temperature state about 60 seconds after deenergization of the heating coil portions 180 and 182; and such parameters can be selected to snap the bimetal element 192 to its high temperature state about 45 seconds after energization of the heating coil portions 180 and 182, and to return the bimetal element 192 to its low temperature state about 40 seconds after deenergization of the heating coil portions 180 and 182.

Figure 9:
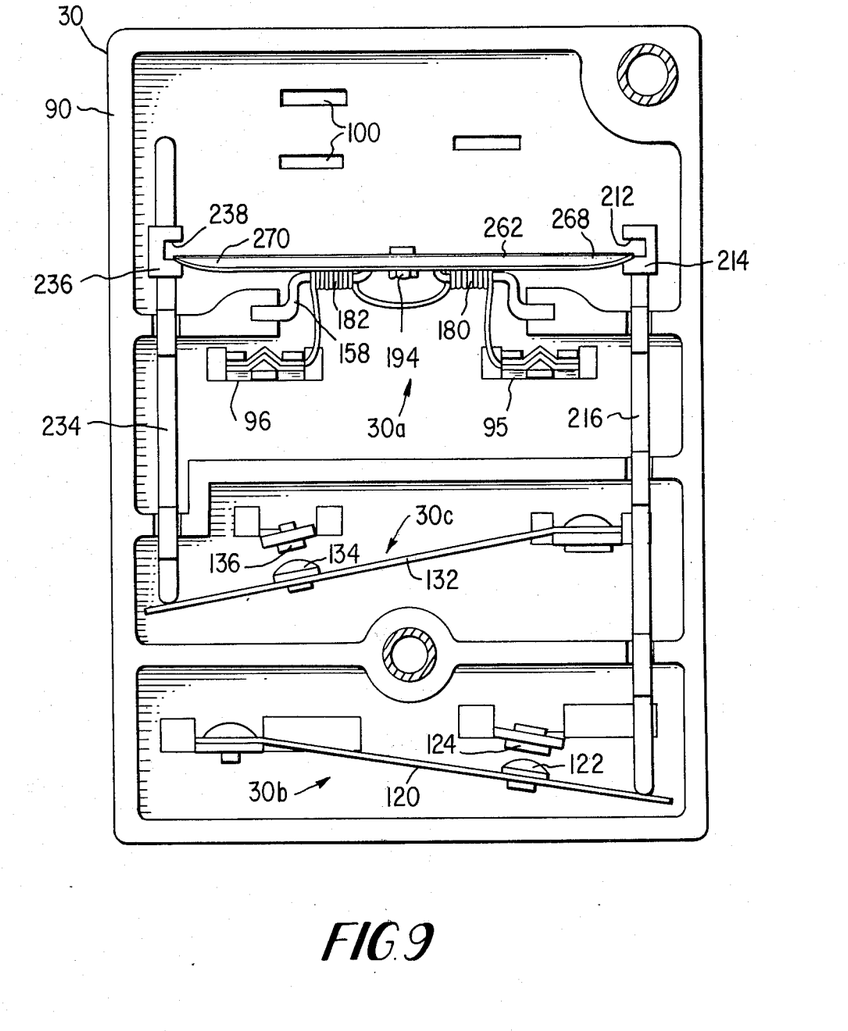
FIG. 9 is an elevation back view of another sequencer shown in the circuit of FIG. 1.

The sequencer 30, shown in FIg. 9, has parts which are identified by the same numerals used to identify parts of the sequencer 32 indicating that such commonly identified parts have substantially similar structure and/or function. The sequencer 30 has a single bimetal element 262 attached by the bolt 194 to the support member 158 at a center point. Oppositely extending free ends or tips 268 and 270 of the element 262 extend into the respective slots 212 and 238 of the switch operators 216 and 234. Similar to the bimetal elements 190 and 192 of the sequencer 32, the bimetal element 262 has a cold formed longitudinal curvature which is held straight by a cold formed transverse curvature opposite to the warp produced by increasing temperatures. Also, the sequencer 30 differs from the sequencer 32 in that the double-throw switch is eliminated by leaving out the terminals 97, 98 and 99, FIG. 3. The slots 100 in the housing 90 where the terminals 97, 98 and 99 have been left out can be left open, or closed with a breakout web formed in molding the housing 90.

As an example, the parameters of the heating coil portions 180 and 182 and the bimetal 262 can be selected to produce simultaneous snap upward movement of the ends 268 and 270 about 25 seconds after energization of the coil portions 180 and 182, and to produce snap downward movement of the ends 268 and 270 about 60 seconds after deenergization of the coil portions 180 and 182. It is noted the coil portions 180 and 182 of the sequencer 30 are designed to operate on half-wave AC voltage instead of the full-wave AC voltage which operates the sequencer 32.

The sequencer 34 is substantially identical to the sequencer 32. Also, the sequencer 36 is similar to the sequencer 32, differing only in that the double-throw switch 32d of sequencer 32 has been left out of the sequencer 36.

In operation of the electric heating system circuit shown in FIG. 1, the thermostat 38 initiates operation of the control switch device 72 which operates the first of serially energized sequencers 30, 32, 34 and 36 to operate the motor 28 and to sequentially energize the heating elements 14, 16, 18, 20, 22, 24 and 26. The switch device 72 is maintained in operation upon opening of the thermostat contacts 38a by the current sensing transformer 76 energizing the control electrode of the control device 72 until after all the sequencers 36, 34 and 32 have been deenergized, thus maintaining the sequencer 30 operated to keep the motor 28 operating when any of the elements 14, 16, 18, 20, 22, 24 and 26 are energized.

More particularly, the thermostat contacts 38a close when the temperature sensed by the thermostat 38 drops below its selected temperature to complete a circuit from the secondary of the transformer 68 through terminal R, the thermostat contacts device 38a, terminal W1 and resistor 74 to the control electrode of the silicon controlled rectifier 72. During positive half-cycles of voltage, the silicon controlled rectifier 72 is energized completing a circuit from the terminal R through the silicon controlled rectifier 72 and the heat motor 30a of the sequencer 30 to the secondary of the transformer 68. After a delay, the switches 30b and 30c operate with the switch 30b completing circuits across power lines 40 and 42 through the blower motor 28 and the resistance heating element 14. Operation of the switch 30c completes a circuit from the secondary of the transformer 68 through the switch 30c, the heat motor 32a of the sequencer 32, terminal W1, the thermostat contacts 38a and terminal R back to the secondary of the transformer 68. After a first duration from the energization of heat motor 32a, the contacts 32b of the sequencer 32 close completing a circuit from power line 44 through the switch 32b, the line 48 and the resistance element 16 to the power line 46. After a second duration, the switch 32c closes completing a circuit from the power line 44 to the line 50 through the resistance element 18 to the power line 46. Simultaneous with the operation of switch 32c, the switch 32d closes with its normally open contact, completing a circuit from terminal R and terminal W2 through the normally open contact of the switch 32d, the contact arm of the switch 32d, the heat motor 34a of the sequencer 34 to the secondary of the transformer 68. The switches 34b and 34c sequentially operate energizing the heating elements 20 and 22 by current through the lines 56 and 58 from the power lines 52 and 54. The switch 34d also operates simultaneously with the switch 34c, energizing the sequencer 36 which sequentially closes the switches 36b and 36c energizing the heating elements 24 and 26 by passing current through lines 64 and 66.

When the thermostat device 38 senses an increase in temperature to its selected temperature, the contacts 38a open disrupting the circuit between terminals R and W1 which deenergizes the heat motor 32a of the sequencer 32. Current passing through any of the lines 48, 50, 56, 58, 64 and 66 generates signals in the coil 82 which maintains the silicon controlled rectifier 72 conductive during positive half cycles of the current from the secondary of the transformer 68, thus maintaining the heat motor 30 of the sequencer 30 energized even though the thermostat contacts 38a open. Upon deenergization of the sequencer 32, the switches 32c and 32d open and then later the switch 32b opens sequentially deenergizing the resistance elements 18 and 16, respectively. When the switch 32d opens, the heat motor 34a of the sequencer 34 is deenergized which, after a duration, sequentially opens the switches 34b and 34c to sequentially deenergize the heating elements 22 and 20. Simultaneous with the opening of the switch 34c, the switch 34d disconnects its contact arm from its normally open contact to deenergize the sequencer 36 which, after a duration, sequentially opens switches 36b and 36c to deenergize the heater elements 26 and 24. When the currents have ceased through all of the lines 48, 50, 56, 58, 64 and 66, the core 76 coes not pick up any further magnetic field generated by currents through the lines 48, 50, 56, 58, 64 and 66 terminating the signals in coil 82. The silicon controlled rectifier 72 blocks current flow to the heat motor 30a, thus deenergizing the sequencer 30 which, after a delay, simultaneously opens contacts 30b and 30c to deenergize the heater element 14 and motor 28.

Figure 7:
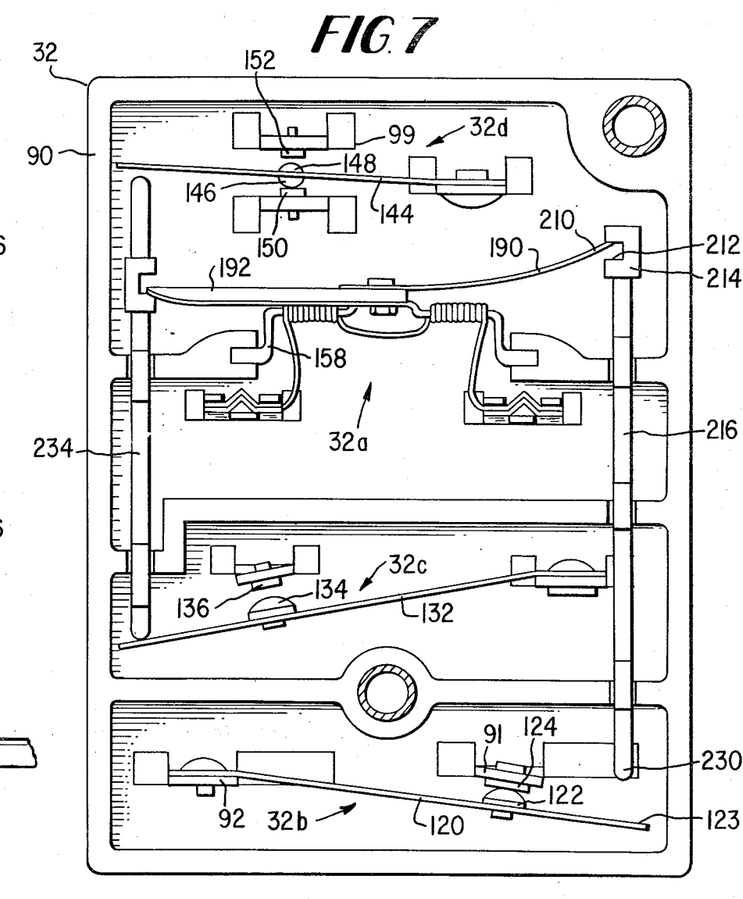
FIG. 7 is a view similar to FIG. 3 but illustrating a first bimetal element in a high temperature state.
Figure 8:
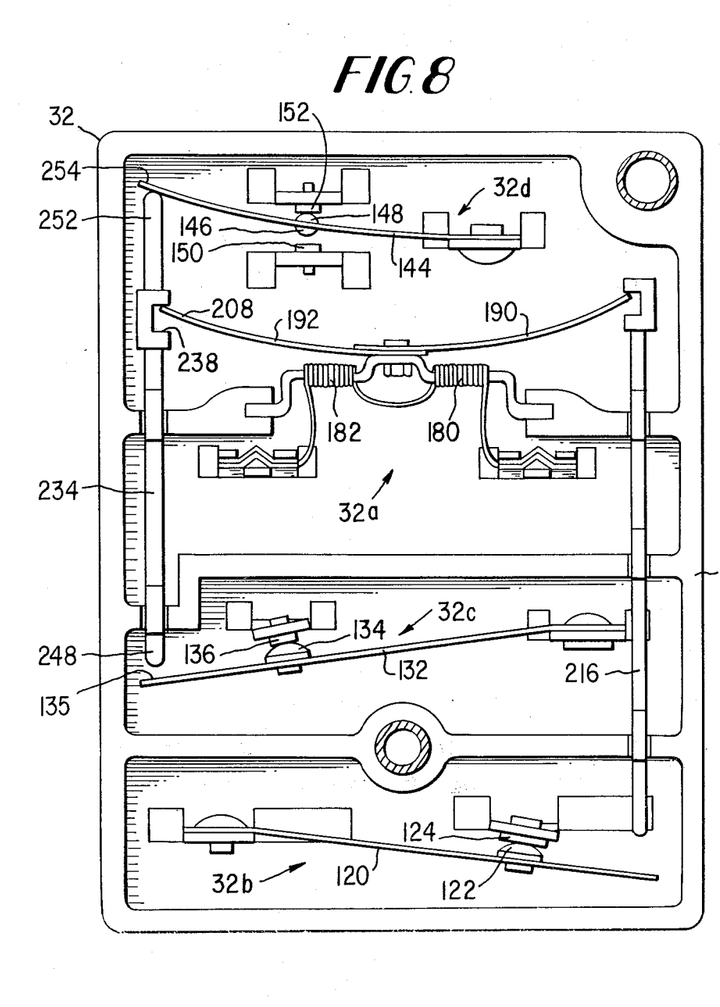
FIG. 8 is a view similar to FIGS. 3 and 7 but illustrating a second bimetal element in a high temperature state.

Referring to FIGS. 2 and 3 when the heat motor 32a is energized by applying voltage across terminals 95 and 96, heat from the heater coil portions 180 and 182 begins raising the temperature of the bimetal elments 190 and 192. At a first temperature, the bistable element 190 snaps to its high temperature state as shown in FIG. 7 whereupon the tip 210 engages the enlarged portion 214 on the upper surface of the slot 216 and moves the operator 216 upward pulling its end 230 out of engagement with the end 123 of the resilient switch arm 120 to allow the full resilient force of the arm 120 to snap the movable contact 122 into engagement with the stationary contact 124. This closes the switch 32b allowing electrical current to flow between the terminals 91 and 92. After a further duration and a further increase in the temperature of the bimetal elements 190 and 192, the bimetal element 192 snaps to its high temperature state, as shown in FIG. 8, causing the tip 208 to engage the upper surface of the slot 238 and move the operator 234 upward. In its upward movement, the end 252 of the operator 234 engages the free end 254 of the contact arm 144 disengaging the movable contact 146 from the stationary contact 150 and engaging the movable contact 148 with the stationary contact 152; this operates the single-pole double-throw switch 32d opening the circuit between the contact arm 144 and the normally closed contact 150 and closing circuit between the contact arm 144 and the normally open contact 152. Simultaneously, the lower end 248 of the operator 234 moves upward disengaging the free end 135 of the switch arm 132 to allow the arm 132 to move upward engaging the movable contact 134 with the stationary contact 136 to close the switch 32c. After deenergization of the coil portions 180 and 182 by removing the voltage from terminals 95 and 96, the bimetal elements 190 and 192 are allowed to cool first snapping the bimetal 192 to its low temperature state, FIG. 7, to open the switch 32c and to allow the switch arm 144 to disengage the contact 143 from the contact 152 and to engage the contact 146 with the contact 150. After further cooling, the bimetal element 190 snaps to its low temperature state, FIG. 3, to open the switch 32b.

In the sequencer 30, the switches 30b and 30c will be simultaneously closed a duration after energization of the heater coil portions 180 and 182 by the upward snapping of the ends 268 and 270 of the bimetal element 262. Also, the switches 30b and 30c will be simultaneously opened when the bimetal element 262 is sufficiently cooled after deenergization of the coil portions 180 and 182.

The use of both the thermostat 38 and the sensing coil 82 for energizing the control electrode of the silicon controlled rectifier 72 together with the use of the silicon controlled rectifier 72 for energizing the first relay or sequencer of a serial energized chain of relays or sequencers eliminates the need for a separate relay to operate the blower motor where a serial chain of delay relays is employed to sequentially energize and deenergize heating elements.

The employment of electrothermal relays having snap-acting bimetal elements, each supported at one end with the free end engaging a switch operator which engages a resilient switch arm, results in a reliable heating system circuit.

Figure 11:
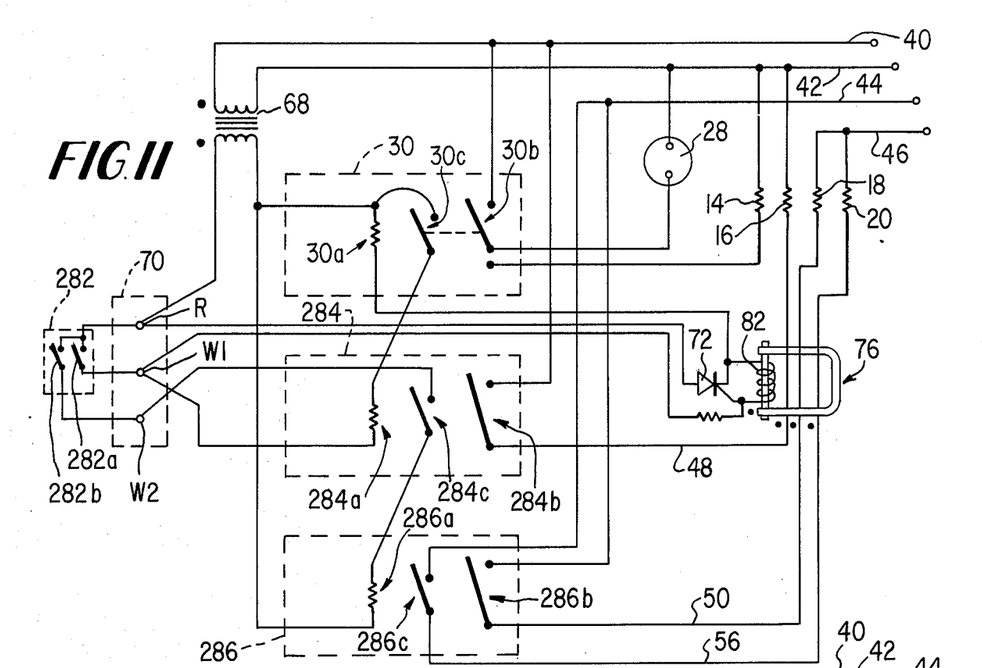
FIG. 11 is a diagram of a variation of the heating system circuit shown in FIG. 1.

A modified heating system circuit, shown in FIG. 11 has parts identified by the same numbers used to identify parts in the circuit shown in FIG. 1 to indicate that such similarly identified parts have substantially similar structure and/or function. The modified heating system circuit has a thermostat 282 which is of the two-stage operating type having first stage contacts 282a in a circuit between terminals R and W1 and second stage contacts 282b between terminals R and W2; the contacts 282a operating at a higher temperature than the contacts 282b. The modified circuit employs sequencers 284 and 286 which are substantially similar to the sequencer 36 of FIG. 1. One side of the switch 284b is connected to the power line 40 while the resistance element 16 is connected between the power line 42 and the line 48 to the other side of the switch 284b. One side of the switch 286b is connected to the power line 44 while the resistance 18 and line 50 are connected between the power line 46 and the other side of the switch 286b. One side of the switch 286c is connected to the power line 44 while the resistance element 20 and the line 56 are connected between the other side of the switch 286c and the power line 46.

In the low voltage control circuitry, the switch 30c is connected in series with the secondary of the transformer and a circuit through the heat motor 284a of the sequencer 284, the terminal W1 and contacts 282a of the dual stage thermostat 282. An energizing circuit for the heat motor 286a of the sequencer 286 includes the switch 284c of the sequencer 284 and the second stage contacts 282b of the thermostatic control 282 across the secondary of the voltage transformer 68.

In operation of the modified heating system circuit shown in FIG. 11, closing of the first stage contacts 282a of the thermostatic switch device 282 causes the energization of the silicon control rectifier 72 and the sequencer 30 in the manner previously described. Operation of sequencer 30 closes switch 30c energizing the heating element 284a of the sequencer 284 which sequentially operates switches 284b and 284c to first energize the heating element 16 and then enable heat motor 286a. Should the temperature sensed by the thermostat 282 require second stage operation, the contacts 282b are closed allowing energization of the heat motor 286a when the switch 284c closes. Operation of the sequencer 286 sequentially closes switches 286b and 286c sequentially energizing the heating elements 18 and 20.

When the temperature no longer requires second stage operation, the contacts 282b open deenergizing the sequencer 286 which first opens contacts 286c and then opens contacts 286b to sequentially deenergize the heating elements 20 and 18. A further increase in temperature results in the opening of the thermostatic contacts 282a which deenergizes the sequencer 284. The silicon controlled rectifier 72 is maintained energized through the pick-up coil 82 until the switch 284b opens allowing deenergization of the silicon controlled rectifier 72 and the sequencer 30 to terminate operation of the motor 28 and the heating element 16.

Figure 12:
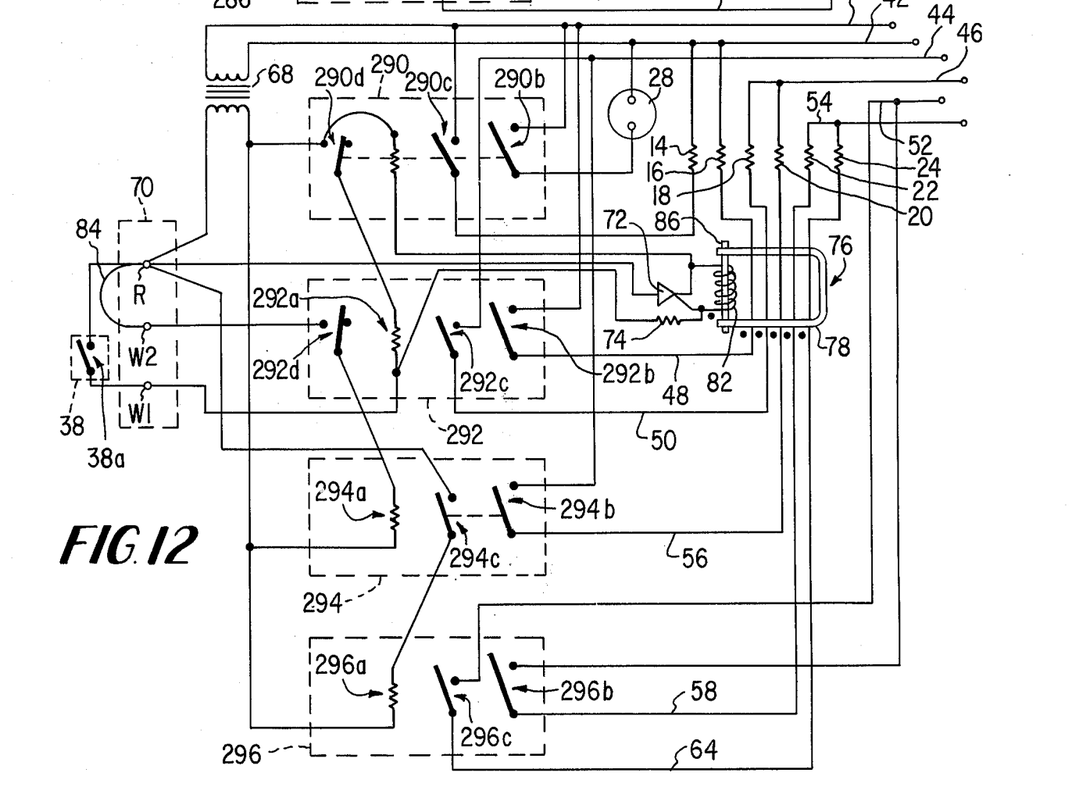
FIG. 12 is a diagram of a still further variation of the heating system circuit shown in FIG. 1.

A further modification of the heating system circuit is shown in FIG. 12 and includes sequencers 290, 292, 294 and 296. The sequencer 290 is of the type wherein the switches 290b, 290c and 290d are simultaneously operated; the sequencer 292 is substantially the same as the sequencer 32 of FIG. 1; the sequencer 294 is substantially the same as the sequencer 30 of FIG. 1; and the sequencer 296 is substantially similar to the sequencer 36 of FIG. 1.

One side of the switch 290b is connected to the power line 40 while the blower motor 28 is connected between the power line 42 and the other side of the switch 290b. The switch 290c is connected in series with the first heating elements 14 across the power lines 40 and 42. One side of switch 292b is connected to the power line 40 while the heating element 16 is connected between the power line 42 and a line 48 to the other side of the switch 292b. Similarly one side of each of the switches 292c and 294b and the switches 296b and 296c is connected to one of the power lines, 44 and 52 while heating elements 18, 20, 22 and 24 are connected between respective power lines 46 and 54 and lines 50, 56, 58 and 64 to the other side of each of the respective switches 292c, 294b, 296b and 296c.

The normally open contact of the switch 290d is connected to one side of the secondary of the transformer 68 while the contact arm of the switch 290d is connected in a series circuit with the heat motor 292a of the sequencer 292 and the thermostat contacts 38a. The normally open contact of switch 292d is connected to the terminal W2 which is connected by the jumper 84 to terminal R of the terminal block 70 and hence to the secondary of the transformer 68. The contact arm of the switch 292d and its normally open contact are connected in series with the heating element 294a of the sequencer 294 in a circuit across the secondary of the transformer 68. The switch 294c is connected in a series circuit with the heat motor 296a of the sequencer 296 across the terminal R and the secondary of the transformer 68.

Figure 10:
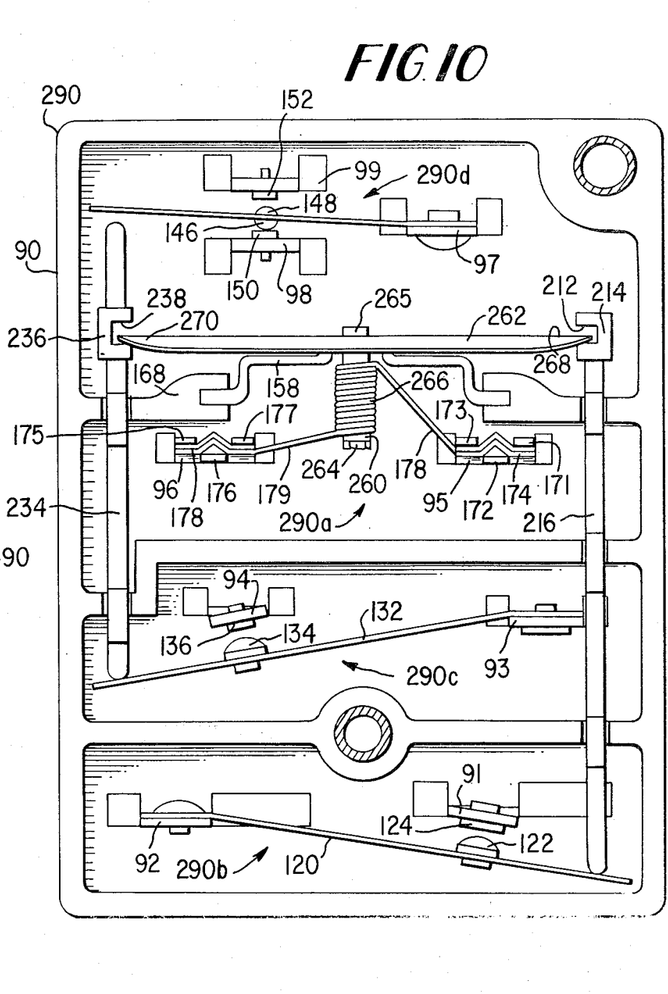
fIG. 10 is a back elevation view showing a modification of the sequencers of FIGS. 2 and 9.

In FIG. 10, there is shown the sequencer 290 wherein parts are identified by the same numbers used in FIGS. 3 and 9 illustrating that such similarly identified parts have the same or similar structure and/or function. The sequencer 290 has a heat motor indicated generally at 290a which has a tubular conductive extension or post 260 attached to the bimetal element 262 and the U-shaped member 158 by a bolt 264 and a nut 265. The post 260, for example, can be a section of a tube, such as an aluminum tube which has an outer thin layer or film of electrical insulation, similar to the layer 186 of FIG. 4, upon which a coil 266 of insulated electrical resistance wire is wound. The ends 178 and 179 of the resistance wire are connected to the terminals 95 and 96 as previously described.

In operation of the modified heating system circuit shown in FIG. 12, the blower motor 28 and the heating element 14 are operated by current passing through the separate switches 290b and 290c which are simultaneously closed by the sequencer 290 after the silicon controlled rectifier 72 is energized by the operation of the thermostatic switch device 38. Thereafter, the switches 292b, 292c, 294b, 296b, and 296c will be sequentially closed to sequentially energize the heating resistance elements 16, 18, 20, 22 and 24.

When the thermostat switch device 38 opens indicating that the temperature has risen to the selected temperature, the heat motor 292a is deenergized resulting in the sequential opening of the switches 292c and 292b with the switch 292d opening simultaneously with the switch 292d. Opening of the switch 292d deenergizes the heat motor 294a which after a duration, simultaneously opens the switches 294b and 294c, the latter of which deenergizes heat motor 296a resulting in the sequential opening of switches 296c and 296b.

While the heating system circuits shown in FIGS. 1, 11 and 12 have employed seven, four and six heating elements, respectively, circuits employing still different numbers of heating elements can be designed in accordance with the present circuits. For example, a circuit with three heating elements can be made by modifying the circuit of FIG. 11 by eliminating the sequencer 286, the line 56, the heating element 20 and the connection from terminal W2 to the switch 284c, and connecting the switch 284c on one side to the power line 44 and on the other side to line 50; and a circuit with five heating elements can be made by modifying the circuit of FIG. 1 by eliminating the sequencer 36, the lines 64 and 66 and the heating elements 24 and 26, and substituting a sequencer similar to sequencer 36 for the sequencer 34. Also a wide range of circuits employing the blower motor 28 on a separate switch 290b can be made by modifying the circuit of FIG. 12; for example, a three heating element circuit can be made by eliminating the sequencer 292, lines 48 and 50 and the heating elements 16 and 18, and connecting the heat motor 294a between the contact arm of switch 290d and the terminal W1; and a five heating element circuit can be made by eliminating sequencer 294, the line 56, and the heating element 20, and connecting the heat motor 296a to the contact arm of switch 292d.

Since many modifications, variations and changes in detail can be made to the present embodiments, it is intended that all matter in the foregoing description and accompanying drawings be interpreted as illustrative and not in a limiting sense.

What is claimed is:

1. A circuit for an electrical heating system comprising
first, second and third switches,
control switch means for operating the first switch, said control switch means having a control electrode which when energized operates the control switch means,
means for operating the second switch a predetermined duration after the operation of the first switch,
means for operating the third switch a predetermined duration after the operation of the second switch,
first and second heating elements connected to the respective second and third switches to be energized when the respective second and third switches are operated,
fluid moving motor means operated by operation of the first switch for moving a fluid medium over the first and second heating elements,
a thermostat having contacts which are closed at temperatures below a selected temperature and open at temperatures above the selected temperature, said contacts connected to the control electrode for energizing the control electrode when closed, and connected in series with the second switch operating means for sequentially terminating operation of the second switch operating means and the third switch operating means when open, and
means sensing energization of any of the first and second heating elements and connected to the control electrode for energizing the control electrode.

2. A circuit for a heating system as claimed in claim 1 wherein
there are included first and second lines connected to said first and second heating elements for energizing the first and second heating elements, and
the energizing means includes a ferro-magnetic core inductively coupled to said first and second lines, and a pick up coil wound on the magnetic core for energizing the pick up coil would on the magnetic core for energizing the control electrode of the control switch means.

3. A circuit for a heating system as claimed in claim 2 wherein the control switch means is a semiconductive switch device.

4. A circuit for a heating system comprising
a plurality of thermally operated relays, each having normally open first and second switches and a heat motor, said first and second switches being closable by energizing the respective heat motor for at least a predetermined duration,
a blower motor serially connected with the first normally open switch of a first of the plurality of relays,
a plurality of electric heating elements, each of said plurality of electric heating elements being connected in series with the first normally open switch of respective relays of the plurality of relays.
the heat motor of each relay except the first relay of the plurality of relays being connected in series with the second switches of respective preceding relays,
control switch means for energizing the heat motor of the first relay, said control switch means having a control electrode which when energized operates the control switch means,
thermostat means for energizing the control electrode of the control switch means at temperatures below a selected temperature, and for deenergizing the heat motor of a second relay at temperature above the selected temperature,
means sensing energization of any of the plurality of electric heating elements and connected to the control electrode for energizing the control electrode.

5. A circuit for a heating system as claimed in claim 4 wherein
there are included a plurality of lines, each connected in series with a respective one of the heating elements, and
the control electrode energizing means include a ferro-magnetic core inductively coupled to all of the plurality of lines, and a pick up coil wound on the magnetic core for energizing the control electrode of the control switch means.

6. A circuit for a heating system as claimed in claim 5 wherein
the control switch means is a semi-conductive element.

7. A circuit for a heating system as defined in claim 4 wherein the heat motor of each relay includes
a snap-acting bimetal element, and
electric heating means for heating the bimetal element.

8. A circuit for a heating system as defined in claim 7 wherein
the snap-acting bimetal element is an elongated striplike bimetal element formed with a transverse curvature which is straightened by transverse temperature warp of the bimetal element produced by increasing temperature, said transverse curvature retaining the bimetal element against longitudinal curvature until a temperature is reached whereat longitudinal curvature forces exceed retaining forces of the transverse curvature producing a snap longitudinal curvature change, and
the electric heating means includes a thermoconductive support for supporting one end of the bimetal element and an electrical resistance heating winding wound on the thermoconductive support.

* * * * *